United States Patent
Ramsauer

(10) Patent No.: US 10,941,798 B2
(45) Date of Patent: Mar. 9, 2021

(54) SNAP CONNECTOR

(71) Applicant: Dieter Ramsauer, Schwelm (DE)

(72) Inventor: Dieter Ramsauer, Schwelm (DE)

( * ) Notice: Subject to any disclaimer, the term of this patent is extended or adjusted under 35 U.S.C. 154(b) by 0 days.

(21) Appl. No.: 16/491,216

(22) PCT Filed: Feb. 26, 2018

(86) PCT No.: PCT/EP2018/000076
§ 371 (c)(1),
(2) Date: Sep. 5, 2019

(87) PCT Pub. No.: WO2018/162114
PCT Pub. Date: Sep. 13, 2018

(65) Prior Publication Data
US 2020/0025233 A1    Jan. 23, 2020

(30) Foreign Application Priority Data

Mar. 6, 2017 (DE) .................. 202017001165.4

(51) Int. Cl.
*F16B 13/04* (2006.01)
*F16B 2/22* (2006.01)
(Continued)

(52) U.S. Cl.
CPC ............... *F16B 13/04* (2013.01); *F16B 2/22* (2013.01); *F16B 5/0635* (2013.01); *F16B 5/0642* (2013.01); *F16B 2013/007* (2013.01)

(58) Field of Classification Search
CPC ...... F16B 13/04; F16B 2/22; F16B 2013/007; E05D 5/023; E05D 5/0238; E05D 9/08; E05D 7/12; E05C 19/028
See application file for complete search history.

(56) References Cited

U.S. PATENT DOCUMENTS

| | | | | |
|---|---|---|---|---|
| 1,426,239 A | * | 8/1922 | Witzberger | ........... F16B 5/0642 |
| | | | | 411/385 |
| 1,538,320 A | * | 5/1925 | Gullong | .................... G09F 7/18 |
| | | | | 40/663 |

(Continued)

FOREIGN PATENT DOCUMENTS

| | | |
|---|---|---|
| CN | 1788136 | 6/2006 |
| CN | 2839501 | 11/2006 |

(Continued)

OTHER PUBLICATIONS

International Search Report PCT/EP2018/000076 dated May 18, 2018.

(Continued)

*Primary Examiner* — Robert Sandy
*Assistant Examiner* — Rowland Do
(74) *Attorney, Agent, or Firm* — Haug Partners LLP

(57) ABSTRACT

A snap connector for rapid mounting of fittings in a rectangular hole in a thin wall. The snap connector includes a head part to be arranged on an outer side of the thin wall. A body part penetrates the hole when mounted. Separate retaining elements protrude from said body part, and the free end of the retaining elements is provided with a first oblique face for trap-like holding and a second oblique face for play-free supporting of the body part on or against the rim or edge of the hole in the other, inner side of the thin wall. The retaining element is a slide that is guided by walls of a channel of substantially rectangular cross-section which is formed by the body part and has opposite walls. The walls have reinforcing ribs, transverse to the channel axis, on the outer wall face facing away from the channel.

11 Claims, 3 Drawing Sheets

(51) Int. Cl.
*F16B 5/06* (2006.01)
*F16B 13/00* (2006.01)

(56) References Cited

U.S. PATENT DOCUMENTS

| | | | | |
|---|---|---|---|---|
| 3,583,736 | A * | 6/1971 | Willimzik | E05C 7/06 292/16 |
| 5,251,467 | A * | 10/1993 | Anderson | E05B 9/084 411/508 |
| 7,690,083 | B2 * | 4/2010 | Ramsauer | E05B 9/08 16/382 |
| 8,001,656 | B2 * | 8/2011 | Ramsauer | E05B 1/0015 16/416 |
| 8,667,819 | B2 * | 3/2014 | Ramsauer | E05C 3/042 70/208 |
| 8,943,653 | B2 * | 2/2015 | Ramsauer | E05D 5/023 16/383 |
| 9,021,660 | B2 * | 5/2015 | Ramsauer | E05B 1/0015 16/416 |
| 2006/0283217 | A1 * | 12/2006 | Ramsauer | E05C 1/16 70/162 |
| 2008/0127458 | A1 * | 6/2008 | Ramsauer | E05B 1/0015 16/412 |
| 2009/0160199 | A1 * | 6/2009 | Ramsauer | E05D 7/12 292/256 |

FOREIGN PATENT DOCUMENTS

| | | |
|---|---|---|
| CN | 101736939 | 6/2010 |
| CN | 201865476 | 6/2011 |
| CN | 102425350 | 4/2012 |
| DE | 20 2004 016009 | 2/2006 |
| EP | 1 711 672 | 10/2006 |
| WO | WO 2005/071191 | 8/2005 |
| WO | WO 2005071193 | 8/2005 |
| WO | WO 2005071198 | 8/2005 |
| WO | WO 2005/083207 | 9/2005 |

OTHER PUBLICATIONS

Chinese Office Action issued for Application Serial No. 201880017168 dated Jul. 3, 2020.

* cited by examiner

SNAP CONNECTOR

The present application claims priority from International Patent Application No. PCT/EP2018/000076 filed on Feb. 26, 2018, which claims priority from German Patent Application No. DE 20 2017 001 165.4 filed on Mar. 6, 2017, the disclosures of which are incorporated herein by reference in their entirety.

FIELD OF THE INVENTION

It is noted that citation or identification of any document in this application is not an admission that such document is available as prior art to the present invention.

The invention relates to a snap connector for the rapid mounting of fitting devices, such as socket key locks, swivel lever locks, hinge parts, thin wall parts provided with an opening such as a perforated angle profile in a rectangular opening in a thin wall, such as a further perforated angle profile, comprising a head part which is to be arranged on the one outer side of the thin wall and which covers the outer edge of the opening, from which head part a body part emanates which, in the assembled position, passes through the opening and from which body part flexible retaining elements protrude in the direction of the outer surface of the body part, at the free end of said retaining elements, a first oblique face for receiving in a latch-like manner and a second oblique face for supporting, without clearance, the clip-like body part on the outer rim or edge of the opening of the other, inner side of the thin wall are arranged, the body part and the retaining element being two separate elements and the retaining element is a slide which is guided by walls of a channel which is substantially rectangular in cross section and is formed by the body part, which channel has opposing walls.

A snap connector of this type is already known, see WO 2005/071191 A1, FIGS. 76A and 75B. Disadvantages of the known connector are its lack of strength transversely to the channel axis and its lack of an adjustment possibility in the direction of the channel axis.

SUMMARY OF THE INVENTION

The object of the invention is to provide further configurations of the known snap connector and to achieve a greater strength.

The object is achieved in that the side walls support reinforcing ribs transversely to the channel axis on the outer wall surface facing away from the channel. As a result of the reinforcing ribs, more material is present in the side walls, thereby producing a greater strength, particularly in the direction transverse to the channel axis, but also in the direction of the channel axis.

According to a further development of the invention, the shape of the rectangular opening in the thin wall is adapted to the outer shape of the outer walls of the body part, and in particular form depressions which receive the reinforcing ribs.

It is advantageous if the opening in the thin wall part also has the depressions, if the snap connector is to be used to fasten a thin wall part to the thin wall.

It is also advantageous if, according to another further development of the invention, the depressions are provided at equal distances in order to form a grid.

According to a yet another embodiment of the invention, the longitudinal extent of the substantially rectangular opening in the wall part is greater than that of the substantially rectangular opening in the thin wall, as this makes it possible to change the position of the wall part on the wall.

Thus, it is favorable if, according to yet another further development of the invention, a grid dimension is provided in which the depression width and the distances between the depressions or, respectively, the web width are approximately 2 mm, which results in a considerable strengthening of the walls which are a factor in the case of the shear forces which are to be absorbed.

Snap connectors can also be arranged through the opening which has three depression in the wall and six depressions in the wall part, or vice versa. In this way, a movability is achieved which, for example, ranges over 3 times 2 mm.

A tool can be provided which retracts the retaining elements in order to release the connection.

The wall and wall part can each be formed by a leg of an angle profile.

BRIEF DESCRIPTION OF THE DRAWINGS

The invention will be described in more detail with reference to exemplary embodiments which are shown in the drawings.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1A:
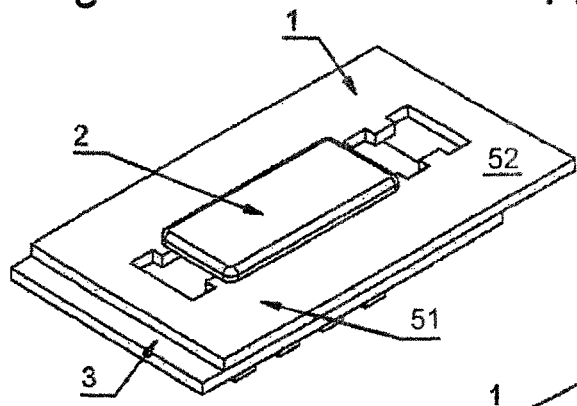
FIG. 1A shows a perspective plan view of the snap connector according to the invention following assembly in a thin wall to hold a wall part on the thin wall.
Figure 1B:
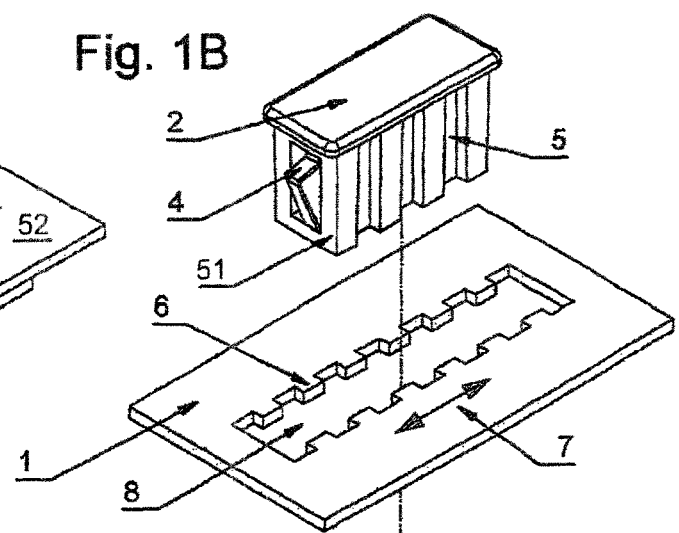
FIG. 1B shows an exploded view of the parts of FIG. 1A.

FIGS. 1A to 1F show a snap connector 52 for the rapid mounting of fitting devices, such as socket key locks (not shown), swivel lever locks (not shown), hinge parts (not shown), or thin wall parts 1 provided with an opening 8 in a substantially rectangular opening 9 in a thin wall 3, the snap connector 52 comprising the following: a head part 2 which is to be arranged on the one outer side of the thin wall—or of the thin wall part—and which covers the outer edge of the opening 8 and from which head part, in the assembled position as shown in FIG. 1A, emanates a body part 5 which passes through the opening 8 or 9, respectively, from which body part 5 flexible retaining elements 4 protrude in the direction of the outer surface 51 of the body part, at the free end of said retaining elements, a first oblique face 54 for a latch-like run-in and a second oblique face 53 for supporting, without clearance, the body part 5 on or along the edge 55 or rim of the opening 9 of the thin wall 3 of the other inner side 56 of the thin wall 3 are arranged, the body part 5 and the retaining element 4 being two separate parts, and the retaining element 4 is guided by walls of the body part, in this respect the body part 5 forms a channel 57 which is provided for two retaining elements 4 and which channel 57 has a rectangular cross section and walls, see reference numeral 58, which support reinforcing ribs 59 on the side facing away from the channel 57. Due to the arrangement according to the invention of the reinforcing ribs which are positioned on the outer wall surface facing away from the channel, not a smooth wall is provided with respect to the channel axis as in the prior art. The advantage of the rib-shaped reinforcement is that it is possible to adapt the shape of the rectangular opening in the thin wall to the outer shape of the walls of the body part 5 which are provided on the outside with ribs, in particular by the formation of depressions 58, which receive the reinforcing ribs 59, to receive end ribs which are arranged in particular at the two end points of the substantially rectangular opening 8 and 9 and provide a reinforcement of the end faces of the body part 5. In this respect, it is advantageous if the depressions are arranged at equal distances in order to form a grid, as can be seen in FIG. 1B with respect to the thin wall part 1 and the thin wall 3, wherein the recesses alternate with protrusions.

Figure 1C:
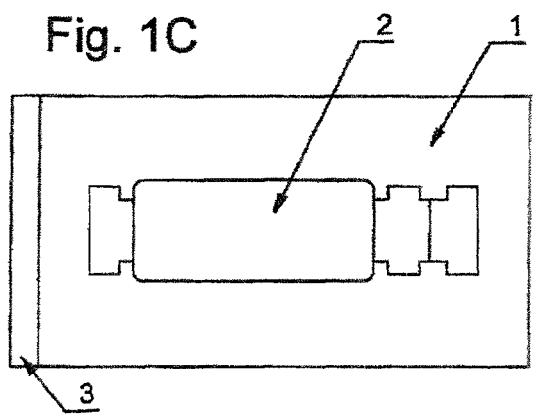
FIG. 1C shows a plan view.

If the longitudinal extent of the one rectangular opening 8 is provided to be greater than that of the opening 9, for example by arranging in one opening, for example in the wall part 1, three more recesses than corresponding protrusions of the body part, it becomes advantageously possible to move the two sheet metal walls relative to one another or relative to the fastening part or snap connector, respectively. It is then possible to accordingly join the supporting wall part 1 to the supported wall part 3, or vice versa, in the manner as shown in FIG. 1C, which means that a wall part 1 is moved to the left or right by a grid dimension, whereupon the snap connector holds the wall 3 and wall part 1 in this shifted position.

Another possibility is to attach to the top surface of the head 2 a hinge part which is then movable relative to the door leaf, represented for example by the sheet metal of the wall 1, in order to adjust the hinge. The wall 3 would then merely serve to press the wall 1 against the snap connector 2 under the influence of the retaining elements 4. This also compensates for a possible weakening due to slit formation due to the opening.

A distance between the depressions or the size of the web width, respectively, of approximately 2 mm has proved to be advantageous, i.e. the two walls are adjustable relative to one another or to the snap connector, respectively, in steps of 2 mm.

Figure 1D:
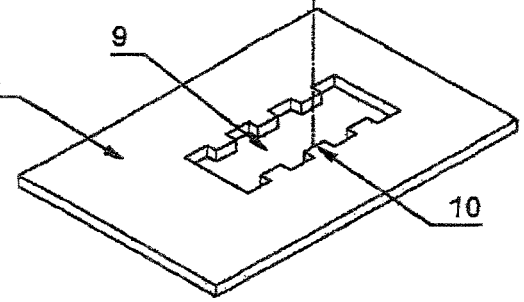
FIG. 1D shows a perspective rear view of the arrangement according to FIG. 1A.
Figure 1E:
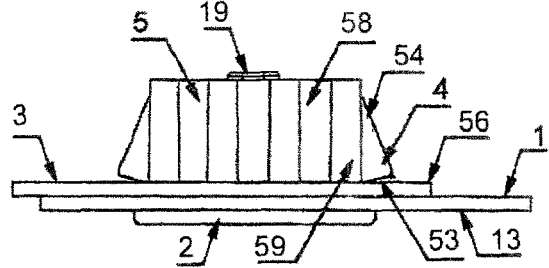
FIG. 1E shows a side view of the arrangement according to FIG. 1A.
Figure 1F:
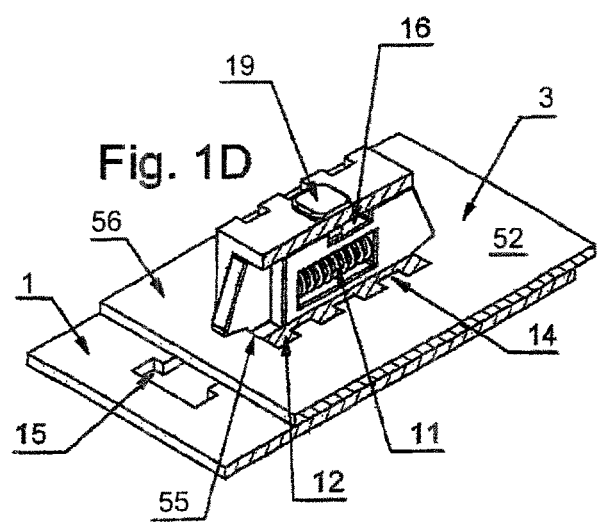
FIG. 1F shows a rear view of the arrangement according to FIG. 1A.
Figure 1F:
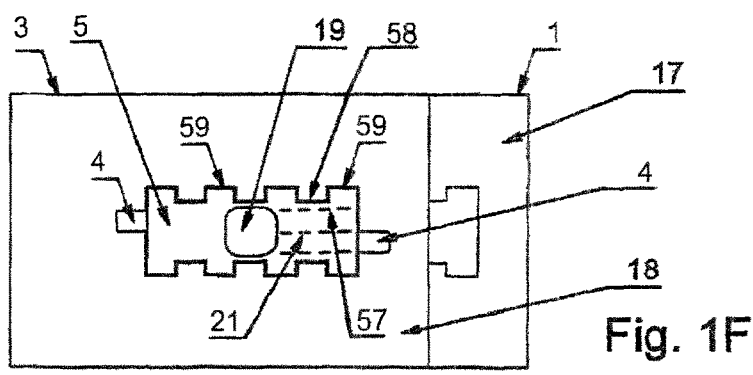

It is advantageous to arrange two slide-like retaining elements, as shown in FIGS. 1F and 1D, wherein the retaining elements support each other and furthermore it is possible to release them by means of a key arrangement 32 or by a tool, such as a screwdriver, after removing a stopper 19. The snap element can only be released from behind, as shown in the arrangements of FIG. 1A to 1F. As mentioned, in the event that the stopper 19 is removed and the edges of the retaining elements are gripped by a standard screwdriver, the retaining elements can be pulled back against the force of a spring 11, so that they are released and the snap connector can be removed. Following removal, the two sheet metal parts can be moved relative to one another by a specific grid dimension and then, as a result of pressing the snap connector into the gridded rectangles, it can again be locked into the presently required position. FIG. 1D shows the stopper 19 as well as the incisions or recesses 16 in the retaining elements 4 which allow the movement against the force of the spring 11. This spring causes the two retaining elements to expand when the tool is removed from the opening which can be closed by the stopper 19.

The rib cross sections 12 and the associated recesses 15 as well as the resulting protrusions 14 form a secure blockade against the movement of the two sheet metal parts relative to one another or, respectively, a blockade-like movement of the snap connector over the metal sheets or the fitting supported by the snap connector, such as a hinge part.

Figure 2A:
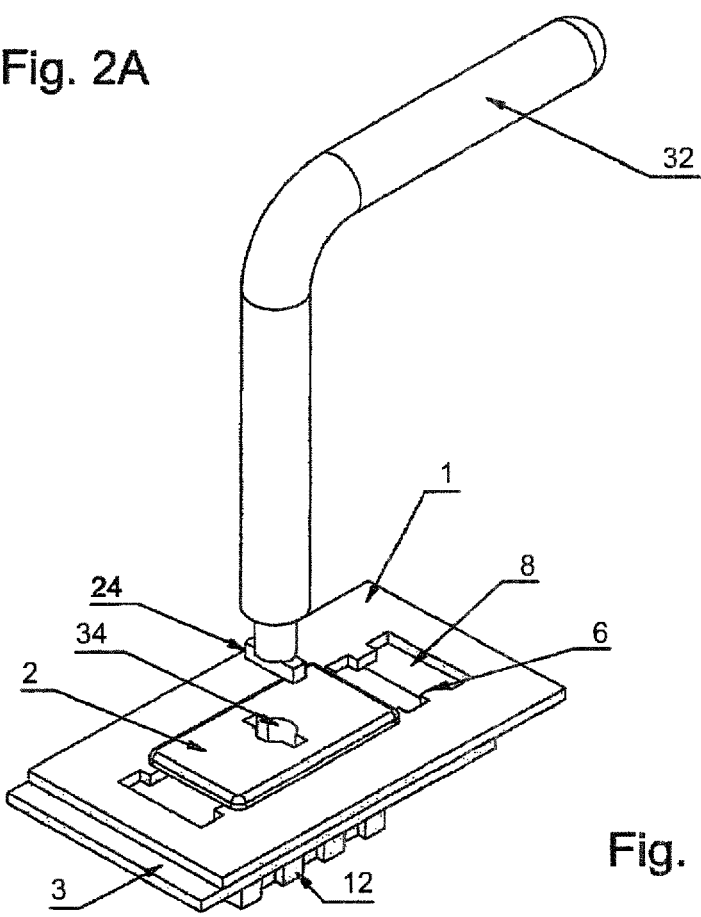
FIG. 2A shows an arrangement similar to FIG. 1A, but with a releasing device.
Figure 2C:
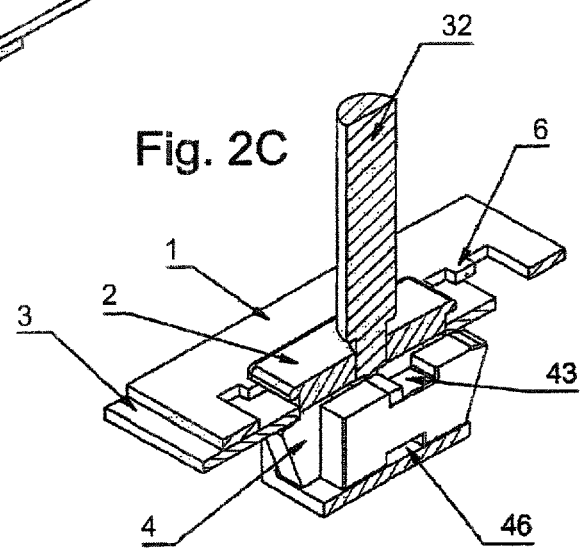
FIG. 2C shows a sectional view through the arrangement according to FIG. 2A.
Figure 2B:
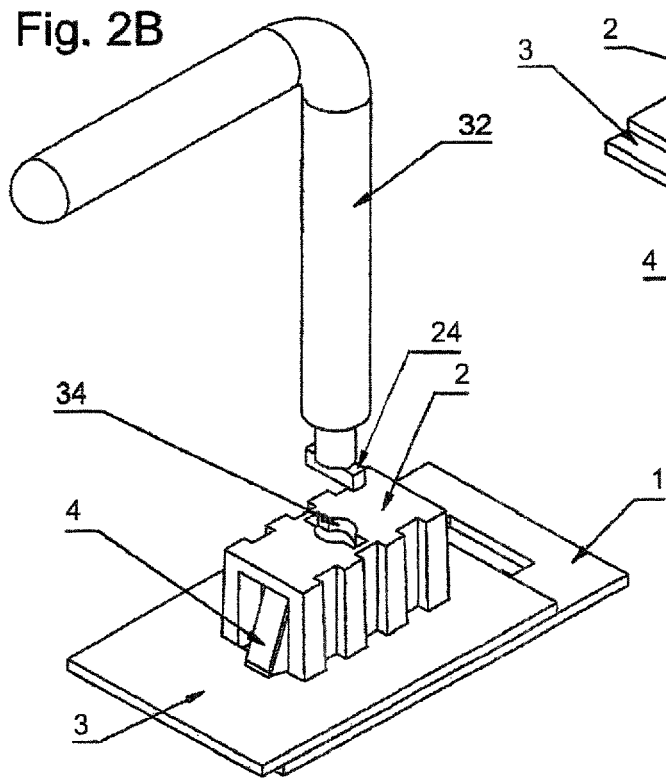
FIG. 2B shows a perspective view from behind of the arrangement, but with the releasing device.

FIG. 2A to 2C show an embodiment in which the snap connector can be released alternatively from the front or from behind by means of a tool handle 32. While FIGS. 2A and 2B allow the snap connector to be released from the outside, i.e. from the head, in FIG. 2B it is possible to release the snap connector from behind the body using a tool. This is achieved in that the lugs 24 of the tool 32 catch hold of recessed shoulders 43 and 46, respectively, and they move the associated retaining element, more specifically inwards when the tool is rotated to the right, when referring to FIG. 2C, while FIG. 2B provides a leftwards rotation of the tool 32 or tool key 32.

Figure 3A:
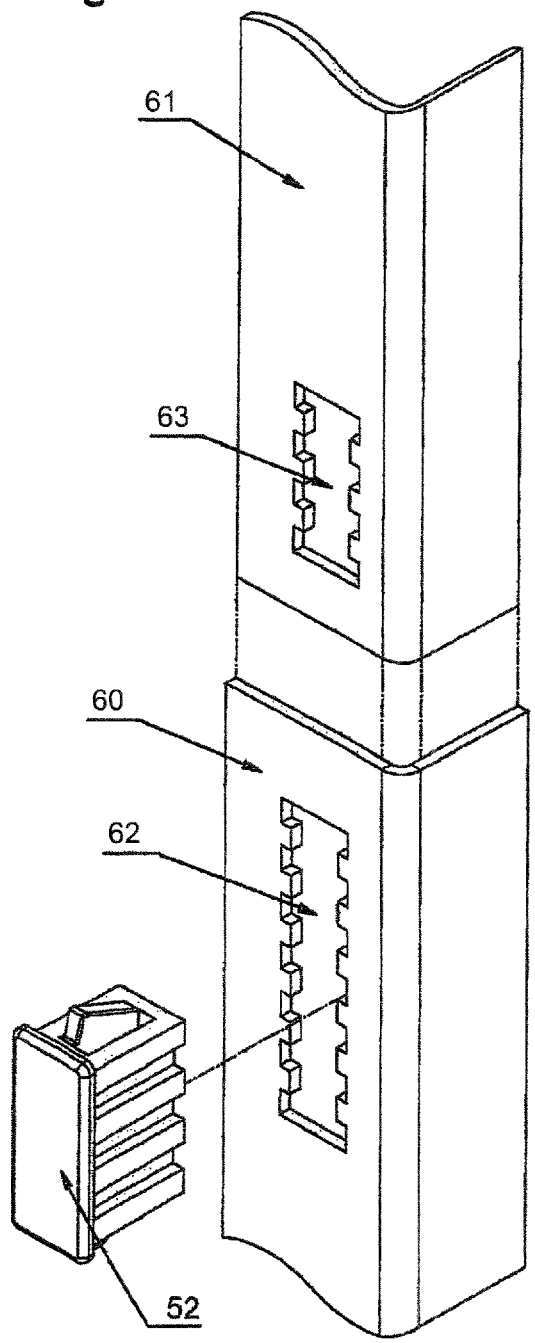
FIGS. 3A to 3C show a perspective view, according to FIG. 3A, of the exploded arrangement of two angle profiles, such as two legs of angled metal rails, joined by a snap connector in a plan view according to FIG. 3B and in a rear view according to FIG. 3C.
Figure 3B:
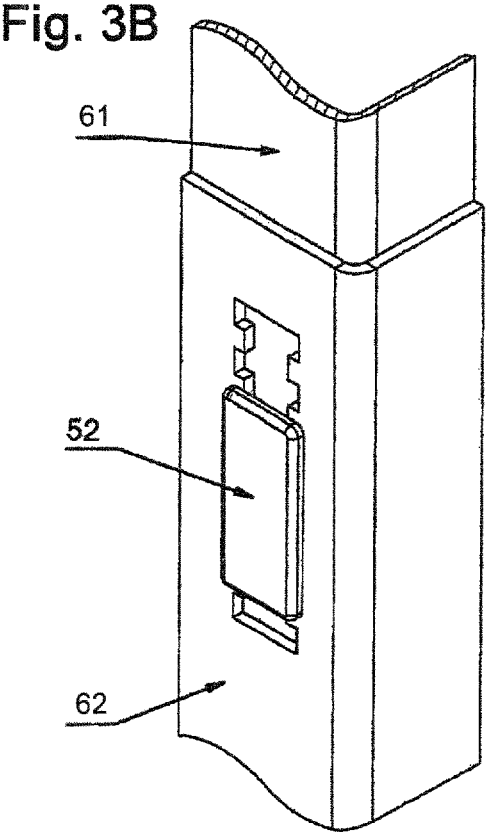
Figure 3C:
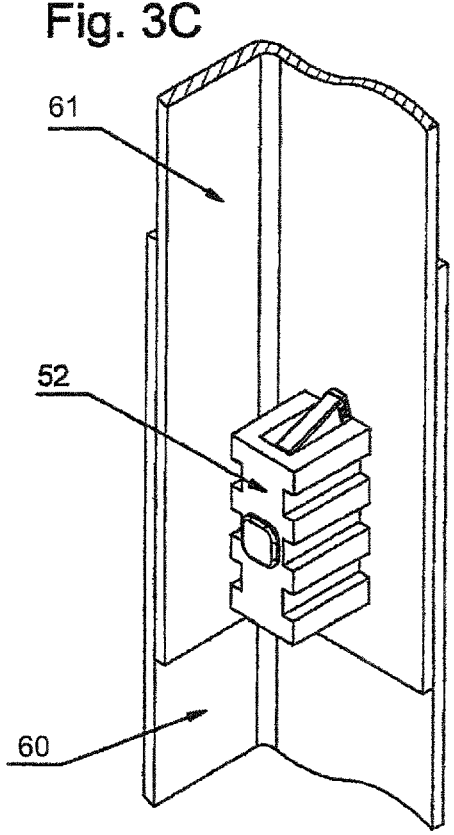

FIG. 3A, 3B, 3C specifically show an application of the snap connector 52 according to the invention, in which two angle pieces 60, 61 are connected one inside the other by only one snap connector 52.

FIG. 3B is a perspective outer view and FIG. 3C is a corresponding perspective view of the inner region of two angle profiles 60, 61 which are shown in exploded view in FIG. 3A and which can be part of a frame of a table leg or chair leg, and their height being quickly adjustable by means of the snap connector according to the invention by releasing the snap connector using a tool, such as a screwdriver and, after removal from the opening 63 on the angle profile 61, 60, re-inserting the snap connector in an appropriately altered position; for example, into the position shown in FIG. 3B. In this respect, the protrusions on the walls of the channel and the incisions allow a considerable loading in the axial direction of the angle profiles and transversely thereto, with a load which is significantly greater compared to a conventional arrangement of frames, so that the elongated form of the openings does not cause any weakening of the connection according to the invention.

COMMERCIAL APPLICABILITY

The invention is commercially applicable in control cabinet construction.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE NUMERALS 1 thin wall part
2 head part
3 thin wall
4 retaining element
5 body part
6 grid protrusion of wall 1
7 movement possibility
8 opening
9 opening
10 grid protrusion of wall 3
11 compression spring
12 rib cross section
13 outer surface of wall part 1
14 grid recess of wall 3
15 grid recess of wall 1
16 recess
17 inner surface of wall 1
18 inner surface of wall 3
19 stopper
21 channel axis
24 lugs
32 tool
43 recessed shoulder
46 recessed shoulder
50 snap connector
51 outer surface of body part 5
52 snap connector
53 second oblique face for clearance-free support
54 first oblique face for latch-like run-in
55 edge, rim
56 inner side
57 channel
58 channel wall, depression
59 rib
60 angled profile
61 angled profile
62 opening
63 opening

The invention claimed is:

1. A snap connector for the rapid mounting of fitting devices in a rectangular opening in a thin wall comprising:
 a head part configured to be arranged on an outer side of the thin wall so that the head part covers an outer edge of the opening;
 a body part that extends from the head part and which, in an assembled position, passes through the opening; and
 flexible retaining elements that protrude from the body part in a direction of an outer surface of the body part;
 wherein a free end of each retaining element has:
  a first oblique face; and
  a second oblique face configured to support the body part on or at an inner edge of the opening of an inner side of the thin wall;
 wherein the body part and the retaining elements are separate elements and each retaining element is a slide that is guided by opposing walls of a channel that is substantially rectangular in cross section and is formed by the body part; and
 wherein the opposing walls support reinforcing ribs transversely to a channel axis on an outer wall surface facing away from the channel.

2. The snap connector according to claim 1;
 wherein the reinforcing ribs are configured to be received by depressions formed in the rectangular opening in the thin wall.

3. The snap connector according to claim 2, further comprising:
 a thin wall part configured to be arranged between the head part and the thin wall when the snap connector is mounted in the rectangular opening in the thin wall;
 wherein the thin wall has an opening with depressions; and
 wherein the thin wall part has an opening with depressions configured to receive the reinforcing ribs.

4. The snap connector according to claim 3;
 wherein the depressions of the thin wall part and the depressions of the thin wall are provided at equal distances in order to form a grid.

5. The snap connector according to claim 4;
 wherein a longitudinal extent of the opening of the wall part is configured to be greater than a longitudinal extent of the opening in the thin wall.

6. The snap connector according to claim 5;
 wherein a width of each depression of the thin wall part, a distance between the depressions of the thin wall part, or both, is approximately 2 mm.

7. The snap connector according to claim 6;
 wherein the opening in the thin wall part is configured to have more depressions than the opening in the thin wall.

8. The snap connector according to claim 6;
 wherein the opening in the thin wall part is configured to have fewer depressions than the opening in the thin wall.

9. The snap connector according to claim 2;
 wherein each of two opposed retaining elements are configured to grip an edge of the rectangular opening in the thin wall.

10. The snap connector according claim 3;
 wherein the thin wall part is formed by a leg of an angled profile with a shape that conforms to a leg of an angle profile that forms the thin wall.

11. The snap connector according to claim 1, further comprising
 a tool that retracts the retaining elements.

* * * * *